United States Patent
Pan

(10) Patent No.: US 10,718,969 B2
(45) Date of Patent: Jul. 21, 2020

(54) DISPLAY PANEL

(71) Applicant: Himax Display, Inc., Tainan (TW)

(72) Inventor: Po-Hung Pan, Tainan (TW)

(73) Assignee: Himax Display, Inc., Tainan (TW)

( * ) Notice: Subject to any disclaimer, the term of this patent is extended or adjusted under 35 U.S.C. 154(b) by 0 days.

(21) Appl. No.: 15/968,715

(22) Filed: May 1, 2018

(65) Prior Publication Data

US 2019/0339568 A1 Nov. 7, 2019

(51) Int. Cl.
*G02F 1/1335* (2006.01)
*G02F 1/1339* (2006.01)
*G02F 1/1343* (2006.01)

(52) U.S. Cl.
CPC ...... *G02F 1/133512* (2013.01); *G02F 1/1339* (2013.01); *G02F 1/13439* (2013.01); *G02F 2201/501* (2013.01)

(58) Field of Classification Search
CPC ... G02F 2001/133388; G02F 1/133512; G02F 1/136209; G02F 1/1339; G02F 2001/133368; G02F 2201/56
See application file for complete search history.

(56) References Cited

U.S. PATENT DOCUMENTS

2007/0263159 A1 11/2007 Kobayashi et al.
2010/0079718 A1* 4/2010 Sekiya .............. G02F 1/133512
349/153
2011/0149217 A1* 6/2011 Yoon ...................... G02B 5/008
349/106
2013/0128192 A1 5/2013 Ishikawa et al.
2015/0140889 A1 5/2015 Lee et al.
2015/0179586 A1 6/2015 Youk et al.
(Continued)

FOREIGN PATENT DOCUMENTS

CN 101713882 5/2010
JP 2011150187 8/2011
(Continued)

OTHER PUBLICATIONS

"Office Action of Japan Counterpart Application," dated Jul. 9, 2019, p. 1-p. 4.
(Continued)

*Primary Examiner* — Michael H Caley
*Assistant Examiner* — Mariam Qureshi
(74) *Attorney, Agent, or Firm* — JCIPRNET

(57) ABSTRACT

A display panel according to an embodiment has a first region and a central second region surrounded by the first region. The display panel includes a patterned light shielding layer, and a plurality of embedded patterns. The patterned light shielding layer is disposed on a top surface of a top substrate in the first region. The patterned light shielding layer includes a top portion and a plurality of extending portions extending from the top portion toward the top substrate. Each of the embedded patterns is located between two of the adjacent extending portions and covered by the top portion. A further antireflective layer and an outer hydrophobic material layer may be disposed on the top surface at the second region. The embedded patterns may be made of a same material as the top substrate, and the antireflective layer may be made of an inorganic material.

25 Claims, 14 Drawing Sheets

(56) References Cited

U.S. PATENT DOCUMENTS

2016/0238866 A1    8/2016  Yamaguchi
2017/0108737 A1*   4/2017  Tang ..................... G02F 1/1339
2019/0212614 A1*   7/2019  Kwak ............... G02F 1/133512

FOREIGN PATENT DOCUMENTS

| JP | 2012083517  | 4/2012 |
| JP | 2012088684  | 5/2012 |
| JP | 2016029431  | 3/2016 |
| JP | 2017032887  | 2/2017 |
| KR | 20150078096 | 7/2015 |

OTHER PUBLICATIONS

"Search Report of Europe Counterpart Application", dated Jan. 14, 2019, p. 1-p. 5.
"Office Action of Taiwan Counterpart Application," dated May 31, 2019, p. 1-p. 5.
"Office Action of Korea Counterpart Application", dated Apr. 29, 2019, with English translation thereof, p. 1-p. 10.

\* cited by examiner

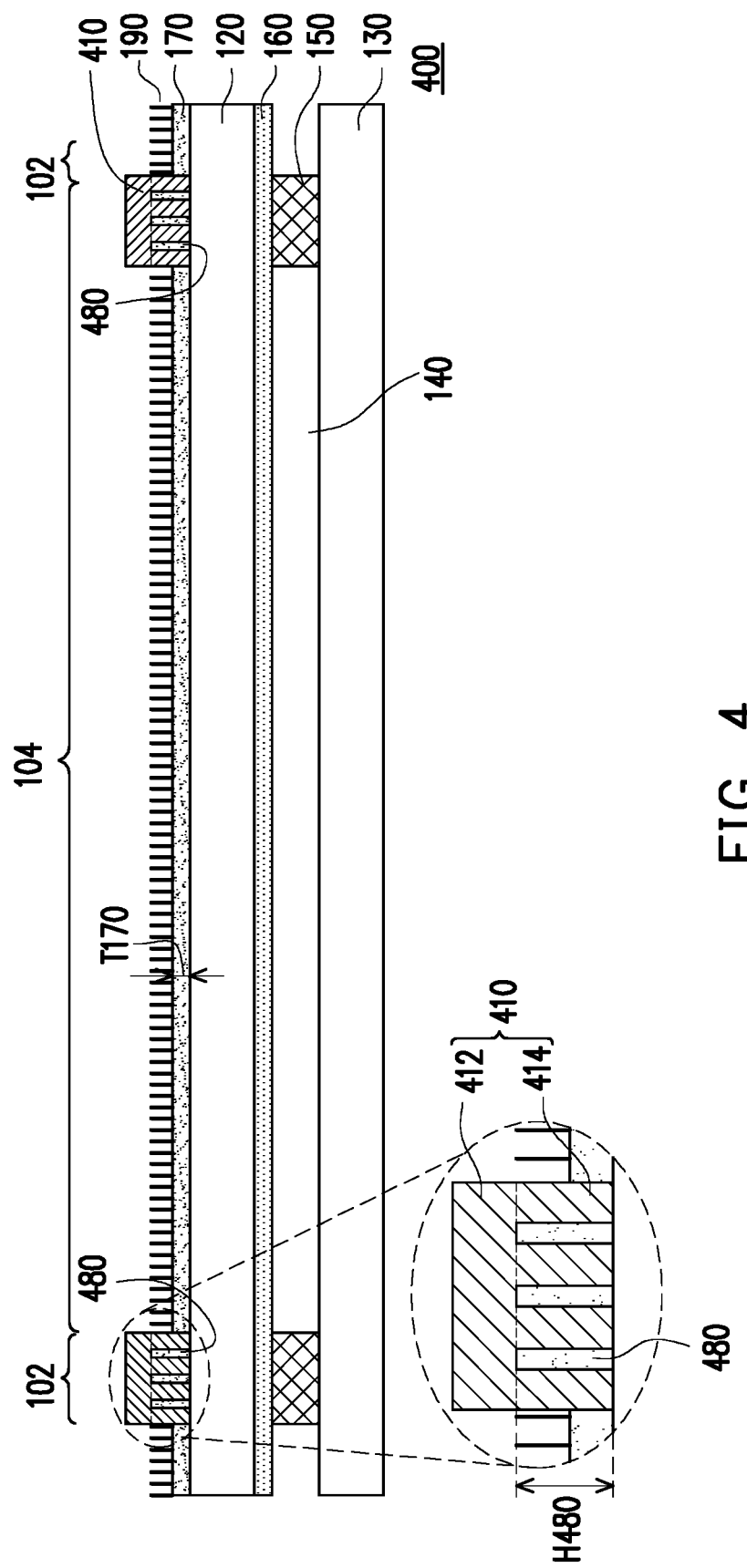

DISPLAY PANEL

BACKGROUND OF THE INVENTION

1. Field of the Invention

The present invention generally relates to an electronic device, in particular, to a display panel.

2. Description of Related Art

For demarcating and defining the display region, a display panel is usually disposed with a patterned light shielding layer such as a black matrix layer, wherein the patterned light shielding layer may have a frame-like pattern and the region surrounded by the frame-like pattern serves as the display region. The black matrix layer may not only define the display region but also prevent unwanted light leakage.

For a liquid crystal display panel, a display medium layer including liquid crystal material is disposed between a top substrate and a bottom substrate while the top substrate and the bottom substrate are attached or assembled with each other via a sealant or an adhesive. For a light curable material as the sealant or the adhesive, a transparent top substrate is necessary to allow a curing light to pass through it and irradiate the light curable sealant or adhesive. In addition, after curing the light curable sealant or adhesive, a light shielding layer is formed on the top surface of the top substrate at the non-display region to shield unwanted light leakage and help improve the display contrast. Owing that the light shielding layer is disposed on the outer surface of the display panel, the adhesive between the light shielding layer and the underlying layer needs to be ensured.

SUMMARY OF THE INVENTION

Accordingly, the present invention is directed to a display panel including a structure to promote adhesion between the light shielding layer and a top substrate of the display panel.

According to an embodiment, a display panel having a first region and a second region surrounded by the first region includes a top substrate, a bottom substrate, a display medium layer, a patterned light shielding layer and a plurality of embedded patterns. The top and bottom substrate are assembled together sandwiching the display medium layer. The patterned light shielding layer disposed on a top surface of the top substrate and located in the first region includes a top portion and a plurality of extending portions between the top portion and the top substrate. Each of the embedded patterns is located in the first region and between two of the adjacent extending portions and covered by the top portion.

In accordance to some embodiments, the display panel may further include a patterned antireflective layer. The patterned antireflective layer covers the second region on the top surface of the top substrate and is surrounded by the patterned light shielding layer.

In accordance to some embodiments, the display panel may further include a hydrophobic material layer. The hydrophobic material layer is disposed on the patterned antireflective layer and is absent in the first region.

In accordance to some embodiments, a height of one of the embedded patterns may be identical or greater than a thickness of the patterned antireflective layer.

In accordance to some embodiments, a material of the embedded patterns may be identical to that of the top substrate, the antireflective layer or may be an inorganic material.

In accordance to some embodiments, where a material of the embedded patterns is identical to that of the top substrate, a top surface of one of the embedded patterns may be coplanar with the top surface of the top substrate. In addition, the embedded patterns may be formed integrally with the top substrate.

In accordance to some embodiments, the top substrate may have a plurality of recesses located in the first region and positioned aligned with respective extending portions, and each extending portion may extend in each respective recess. A plurality of padding patterns may further be disposed in respective recesses where the extending portions are located on tops of respective padding patterns. A material of the padding patterns may be identical to a material of the embedded patterns. The padding patterns may completely fill respective recesses where bottom surfaces of the extending portions are coplanar with the top surface of the top substrate in the second region. Alternatively, the padding patterns may partially fill respective recesses where top surfaces of the extending portions are lower than the top surface of the top substrate. The depth of one of the recesses may be in a range from a couple of micrometers to hundreds of micrometers.

In accordance to some embodiments, the display panel may further include a plurality of raising patterns disposed on tops of respective embedded patterns. The raising patterns may be encased by the patterned light shielding layer and the embedded patterns, and may be aligned with respective embedded patterns. A material of the raising patterns may be an inorganic material.

In accordance to some embodiments, a width of each of the embedded patterns may be in a range from a couple of micrometers to tens of micrometers, and a pitch of the embedded patterns may be in a range from a couple of micrometers to tens of micrometers.

In accordance to some embodiments, the display panel may further include an electrode layer disposed on the top substrate and located between the top substrate and the display medium layer, and a sealant disposed between the top substrate and the bottom substrate, located in the first region and surrounding the display medium layer.

In view of the above, at least the embedded patterns disposed beneath the patterned light shielding layer at the first region provide improved adhesion between the patterned light shielding layer and the top substrate of the display panel. Accordingly, the patterned light shielding layer disposed on the embedded patterns provides a desirable light shielding function so as to improve the quality of the display panel.

BRIEF DESCRIPTION OF THE DRAWINGS

The accompanying drawings are included to provide a further understanding of the invention, and are incorporated in and constitute a part of this specification. The drawings illustrate embodiments of the invention and, together with the descriptions, serve to explain the principles of the invention.

Figure 1A:
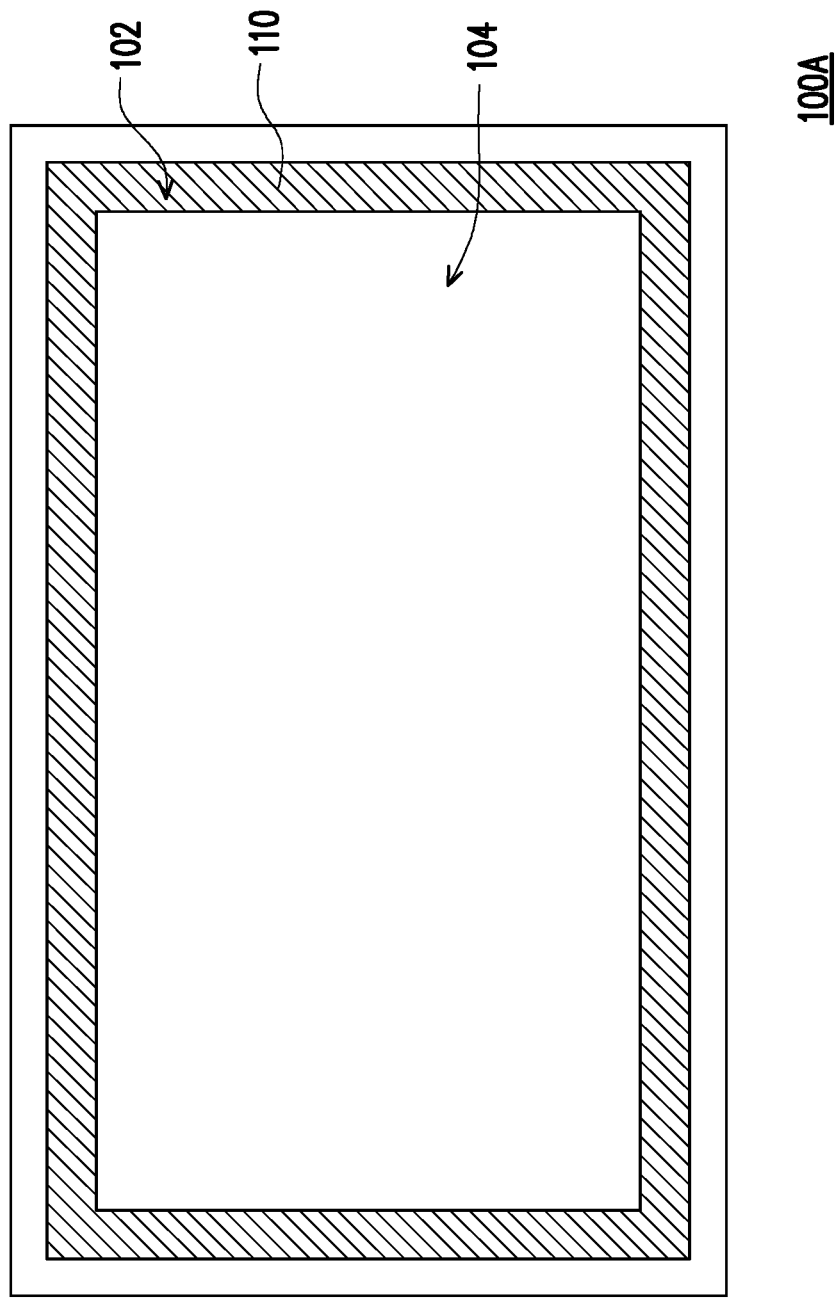
FIG. 1A schematically illustrates a top view of a display panel in accordance with an embodiment of the present disclosure.

Each of FIGS. 3A, 3B, 4-5, 6A, 6B, 7A, 7B, 8 and 9 schematically illustrates a cross section of a display panel according to an embodiment of the present disclosure.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the descriptions to refer to the same or like parts.

FIG. 1A schematically illustrates a top view of a display panel in accordance with an embodiment of the present disclosure. Referring to FIG. 1A, the display panel 100A has a first region 102 and a second region 104. As viewed from above the first region 102 has a frame-like pattern and surrounds the second region 104. In addition, the display panel 100A includes a patterned light shielding layer 110 that is located in the first region 102. Specifically, the patterned light shielding layer 110 has a frame-like pattern in the present embodiment. The first region 102 can be considered as the region where the patterned light shielding layer 110 is disposed. The patterned light shielding layer 110 has a light shielding effect and the display light of the display panel 100A is obstructed or shielded by the patterned light shielding layer 110 so that the displayed image is presented in the second region 104 and the second region 104 can be considered as the display region. In alternative embodiments, the pattern of the patterned light shielding layer 110 may be other patterns according to other design requirements.

In one embodiment, the patterned light shielding layer 110 is formed at the first region 102 on a top substrate of the display panel 100A via a wet process such as an ink-jet printing process, a screen printing process, an APR printing process or the like. For greater adhesion of the patterned light shielding layer 110 to the top substrate, a plurality of embedded patterns is disposed between the top substrate and the patterned light shielding layer 110.

Figure 1B:
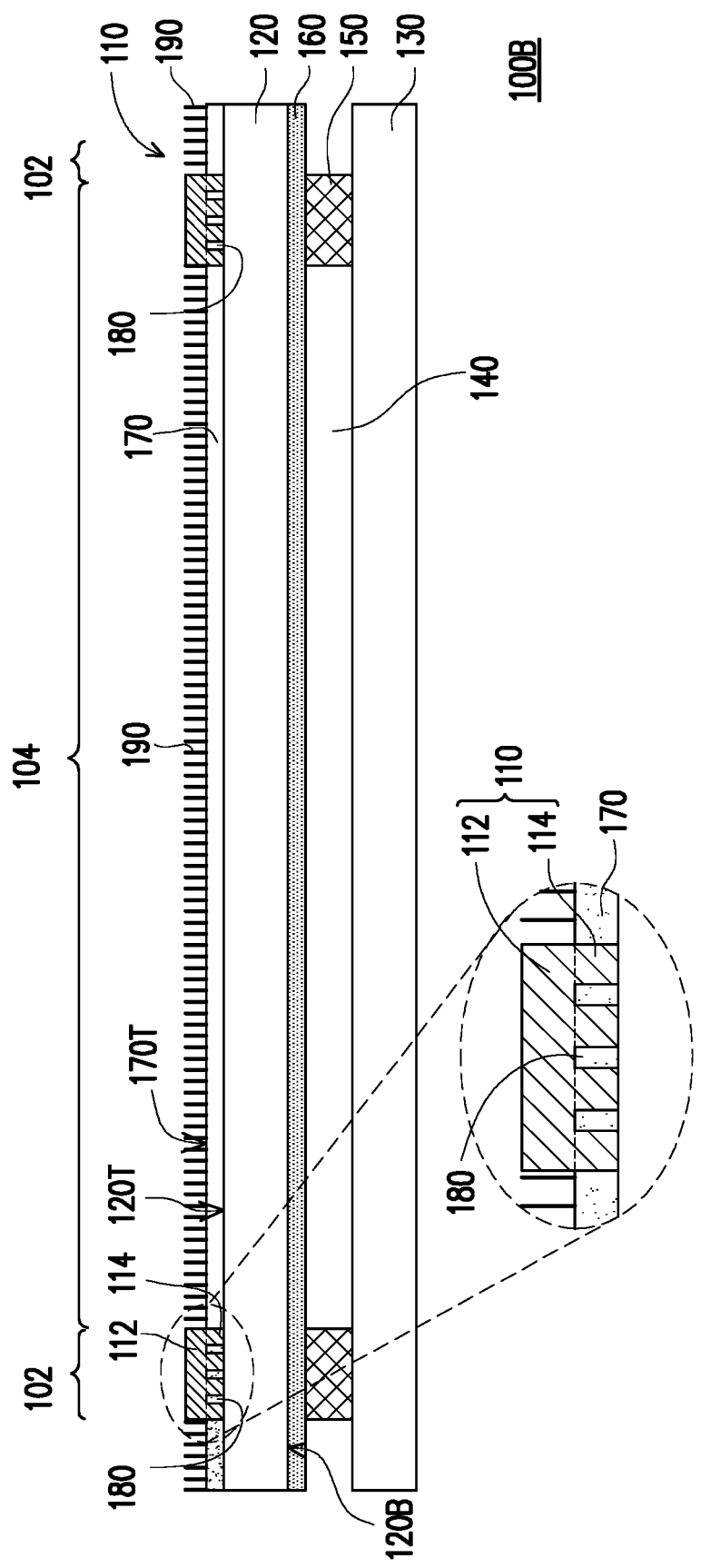
FIG. 1B schematically illustrates a cross sectional view of a display panel, aligned with top view of the display panel of FIG. 1A, in accordance with an embodiment of the present disclosure.

For example, as show in FIG. 1B, which schematically illustrates a cross section of a display panel according to an embodiment of the present disclosure, a display panel 100B includes a patterned light shielding layer 110, a top substrate 120, a bottom substrate 130, a display medium layer 140, a sealant 150, an electrode layer 160, an antireflective layer 170, a plurality of embedded patterns 180 and a hydrophobic material layer 190. The patterned light shielding layer 110 is disposed on a top surface 120T of the top substrate 120, in which the pattern of the patterned light shielding layer 110 as viewed from the top view can be substantially the same or similar to the patterned light shielding layer 110 shown in FIG. 1A. Specifically, the patterned light shielding layer 110 has a frame-like pattern and the display panel 100B has a first region 102 and a second region 104, similar to the first region 102 and the second region 104 depicted in FIG. 1A. In other words, the top view of the display panel 100B is similar to the display panel 100A.

The top substrate 120 and the bottom substrate 130 are arranged opposite to each other and the sealant 150 is disposed between the top substrate 120 and the bottom substrate 130. Specifically, the top substrate 120 and the bottom substrate 130 are assembled with each other via the sealant 150. The display medium layer 140 is disposed between the top substrate 120 and the bottom substrate 130, and is surrounded by the sealant 150. The material of the top substrate 120 may be glass, quartz, or the like. The material of the display medium layer 140 may be a liquid crystal material so that the top substrate 120, the bottom substrate 130, the display medium layer 140 and the sealant 150 may serve as a liquid crystal cell. The electrode layer 160 is disposed on a bottom surface 120B of the top substrate 120 that is facing the display medium layer 140. The material of the electrode layer 140 may be a transparent conductive material, such as indium tin oxide (ITO). The patterned antireflective layer 170 is disposed in the second region 104 on the top surface 120T of the top substrate 120 facing away from the display medium layer 140 and is surrounded by the patterned light shielding layer 110.

Though the drawing presents the bottom substrate 130 as a plate-like structure, the bottom substrate 130 may be a transistor array substrate comprising another support substrate such as a glass plate, or a silicon backplane (not shown) and a transistor array such as a thin film transistor array or a CMOS (Complementary Metal-Oxide Semiconductor) device array (not shown) thereon, wherein the transistor array and the electrode layer 160 may be used for providing the driving electric field to drive the display medium layer 140. In some embodiments, the display panel 100B may be a Thin Film Transistor Liquid Crystal Display (TFT-LCD) panel or an LCoS (Liquid Crystal on Silicon) display panel. In some alternative embodiments, the electrode layer 160 may be omitted based on the driving circuit design of the display panel 100B.

The embedded patterns 180 are located in the first region 102, may have a pitch from a couple of micrometers to tens of micrometers and each of the embedded patterns 180 may have a width from a couple of micrometers to tens of micrometers when measured in the plane of the top surface 120T of the top substrate 120. The patterned light shielding layer 110 includes a top portion 112 and a plurality of extending portions 114 extending from the top portion 112 toward the top substrate 120, and is also located in the first region 102 and disposed on and directly in contact with the embedded patterns 180. Hence, each of the embedded patterns 180 is located between two of the adjacent extending portions 114 and covered by the top portion 112.

In the embodiment, the top portion 112 and the extending portions 114 are form integrally while the top portion 112 of the patterned light shielding layer 110 may be considered as a portion covering the width of the first region 102 and the extending portions 114 of the patterned light shielding layer 110 may be considered as portions extending from the bottom of the top portion 112 toward the top substrate 120 in the thickness direction. Accordingly, the extending portions 114 are located or sandwiched between the top portion 112 and the top substrate 120, and the patterned light shielding layer 110 may have a comb-like pattern in the cross section as shown in FIG. 1B and the embedded patterns 180 are patterns formed in the comb gaps of the comb-like pattern of the patterned light shielding layer 110.

In an embodiment, a material of the embedded patterns 180 is identical to that of the antireflective layer 170, such as an inorganic material including silicon oxide ($SiO_x$), titanium oxide ($TiO_x$) or a combination of both. A height of the embedded patterns 180 may be identical to a thickness of the patterned antireflective layer 170. In some embodiments, the embedded patterns 180 provide a roughened surface at the first region 102 that promotes adhesion between the patterned light shielding layer 110 and the top substrate 120. In some embodiments, a surface roughness of the structure of the top substrate 120 with the embedded patterns 180 thereon at the first region 102 may be more than 1 nm which is obviously greater than the surface roughness of the patterned antireflective layer 170 at the second region 104. Accordingly, the patterned light shielding layer 110 disposed on the embedded patterns 180 provides a desirable light shielding function so as to improve the quality of the display panel 100B.

Additionally, a hydrophobic material layer 190 may be disposed in the second region 104 on an outer top surface 170T of the patterned antireflective layer 170 facing away from the top substrate 120. The patterned antireflective layer 170 and the hydrophobic material layer 190 as found in the second region 104 may also be disposed in a peripheral region surrounding the first region 102, for example, as illustrated in FIG. 1B while the hydrophobic material layer 190 may be absent in the second region 104. The hydrophobic material layer 190 increases the hydrophobicity, where present, of an outer top surface of the display panel 100B when compared to the display panel without the hydrophobic material layer 190.

Figure 2A:
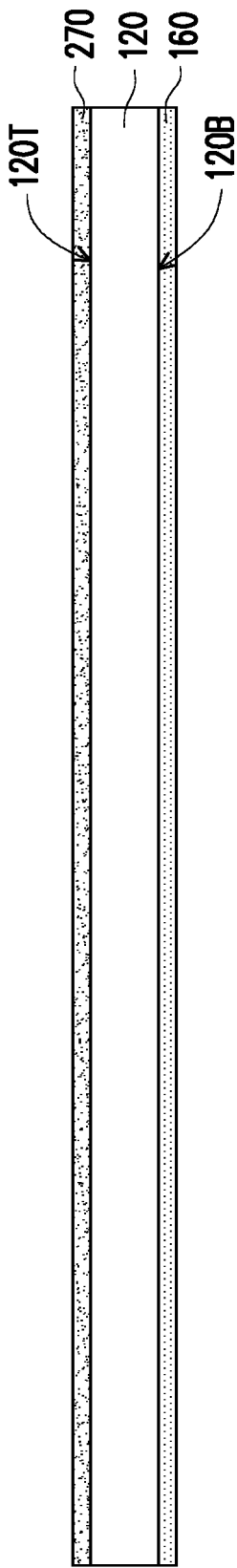
FIGS. 2A to 2D schematically illustrate cross sections of the display panel undergoing a portion of the steps in a manufacturing method of a display panel of FIG. 1B in accordance with an embodiment of the present disclosure.
Figure 2B:
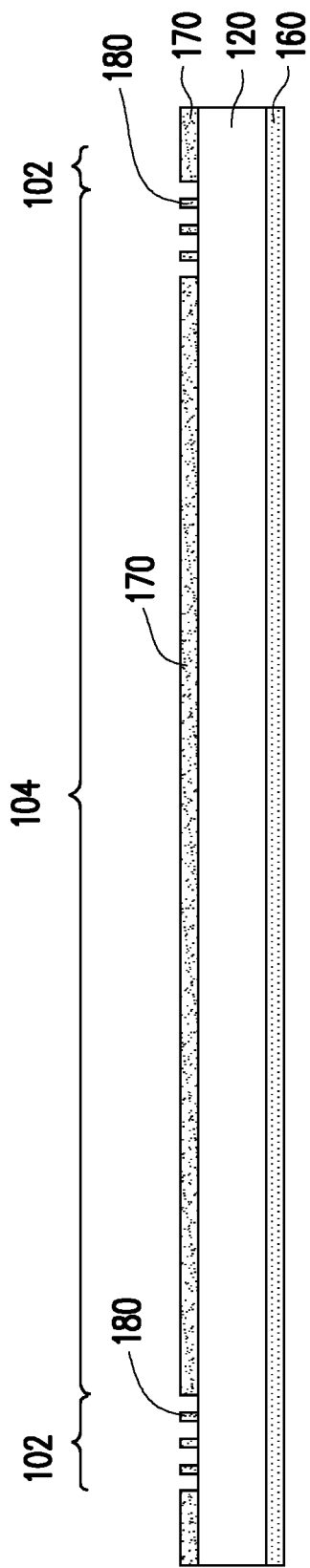

The fabrication process of the display panel 100B, an example of which is illustrated in FIGS. 2A-D, may include the following steps, but is not limited thereto, and the order of the steps is also not limited to the here presented order of the steps. As shown in FIG. 2A, the electrode layer 160 and a blanket antireflective layer 270 are respectively disposed on the bottom and top surfaces 120B and 120T of the top substrate 120. Subsequently, the antireflective layer 270 is then patterned based on a predetermined pattern design to form the patterned antireflective layer 170 and the embedded patterns 180 by, for example, dry or wet etching as shown in FIG. 2B. The embedded patterns 180 are formed to be located in the first region 102 and the patterned antireflective layer 170 is formed to be located in the second region 104 surrounded by the first region 102, optionally in the peripheral region which is located at the outer side of the first region 102. Alternatively, the patterned antireflective layer 170 may be formed by depositing a material of the patterned antireflective layer 170 through a shadow mask, such that the structure shown in FIG. 2B may be obtained after the deposition without a patterning step.

Figure 2C:
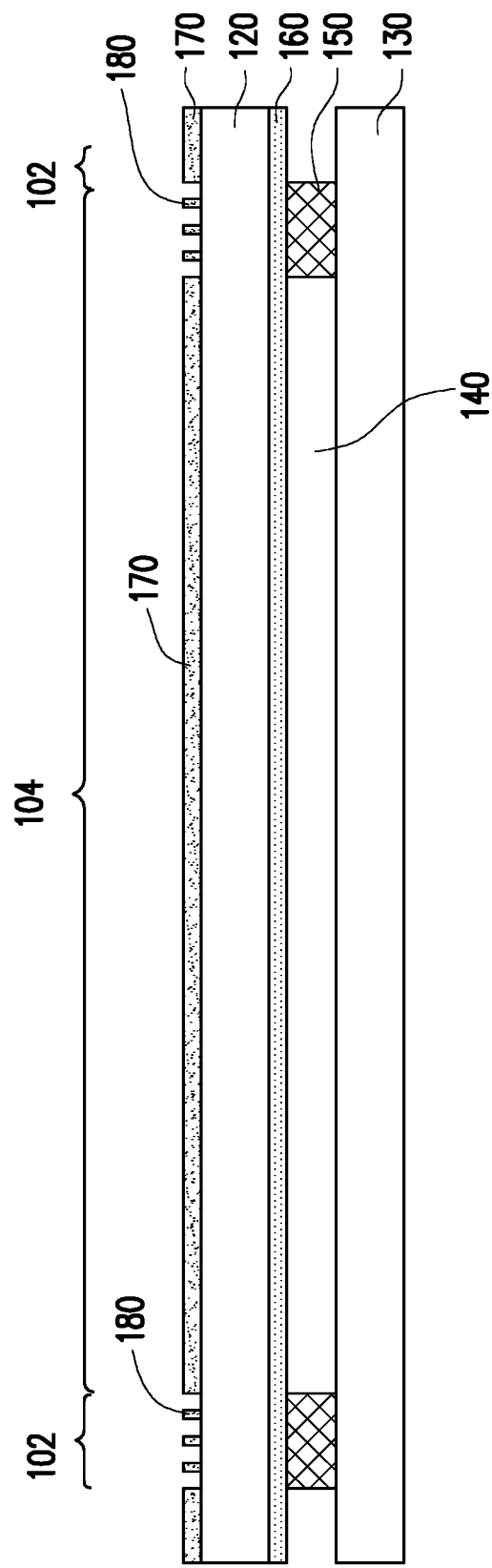

Thereafter, as shown in FIG. 2C, the top substrate 120 and the bottom substrate 130 are assembled via the sealant 150 while the display medium layer 140 fills the gap between the top substrate 120 and the bottom substrate 130. The sealant 150 may be made of a light curable material so that a light curing step may be performed after jointing the top substrate 120 and the bottom substrate 130 via the sealant 150. Accordingly, the first region 102 with the embedded patterns 180 therein is designed to allow the curing light to pass through.

Figure 2D:
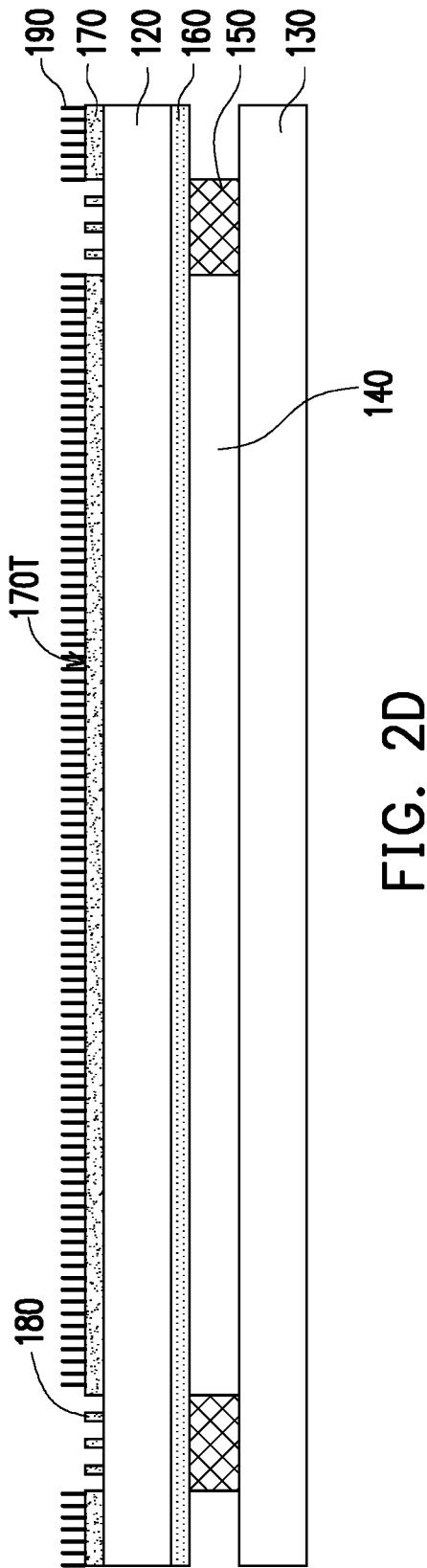

Subsequently, as shown in FIG. 2D, the hydrophobic material layer 190 may be formed on the outer top surface 170T of the patterned antireflective layer 170 to increase the hydrophobicity of the outer top surface 170T of the display panel 100B. The disposing of the hydrophobic material layer 190 on the outer surface 170T of the patterned antireflective layer 170 may involve a surface treatment or modification process, such as a silane surface treatment process, over the whole outer top surface of the display panel 100B. Thereafter, a patterning process may be performed by shielding the second region 104 and optionally the peripheral region via a mask and with an electromagnetic wave irradiating the remaining exposed part of the outer top surface of the display panel 100B. In an example, the electromagnetic wave may be UV (ultraviolet) light or EUV (extreme ultraviolet) light having sufficient energy to decompose the hydrophobic material layer 190 on the irradiated region.

Therefore, after performing the irradiation process, the hydrophobic material layer 190 at the shielded region (the second region 104) remains and the hydrophobic material layer 190 at the exposed region (the first region 102) is decomposed.

Subsequent to the step of FIG. 2D, a wet process such as an inkjet printing process may be performed to form the patterned light shielding layer 110 in the first region 102 to cover the embedded patterns 180 as shown in FIG. 1B, where an ink material is dropped on the embedded patterns 180 and the top substrate 120 at the first region 102. With the roughened surface provided by the embedded patterns 180 and the distribution of the hydrophobic material layer 190, the ink material has significantly stronger adhesion to the top substrate 120 in the first region 102, and so the ink material may spread evenly over the patterned portion in the first region 102 without spilling over to the second region 104. Therefore, the ink material is firmly confined to the first region 102. In addition, the contact angle of the ink material at the boundary between the first region 102 and the second region 104 may be large, for example, larger than 70 degrees. Thereafter, a curing process can be performed to solidify the ink material to form the patterned light shielding layer 110 having a sharp pattern. In particular, the pattern of the patterned light shielding layer 110 may have an edge with good linearity.

Figure 3A:
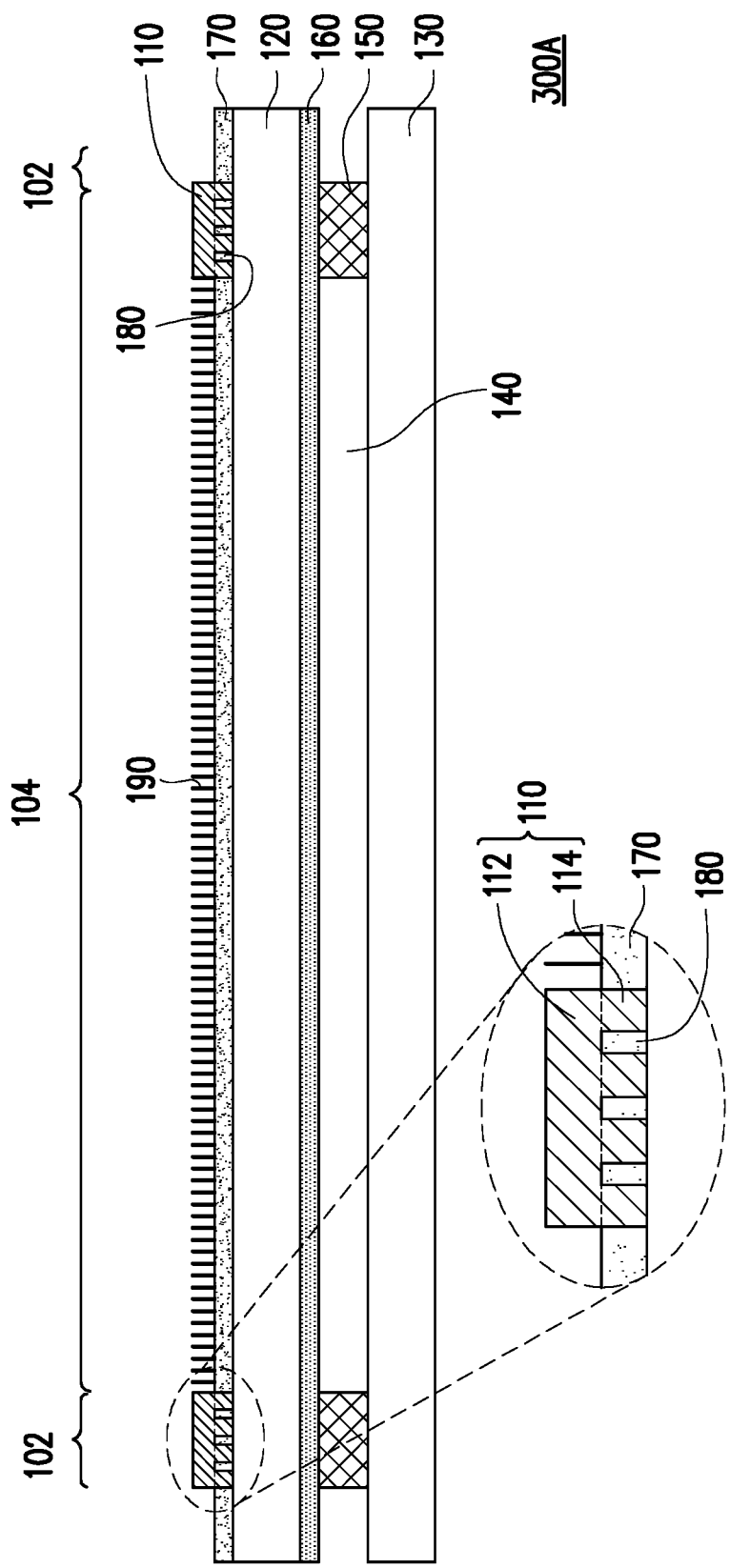
Figure 3B:
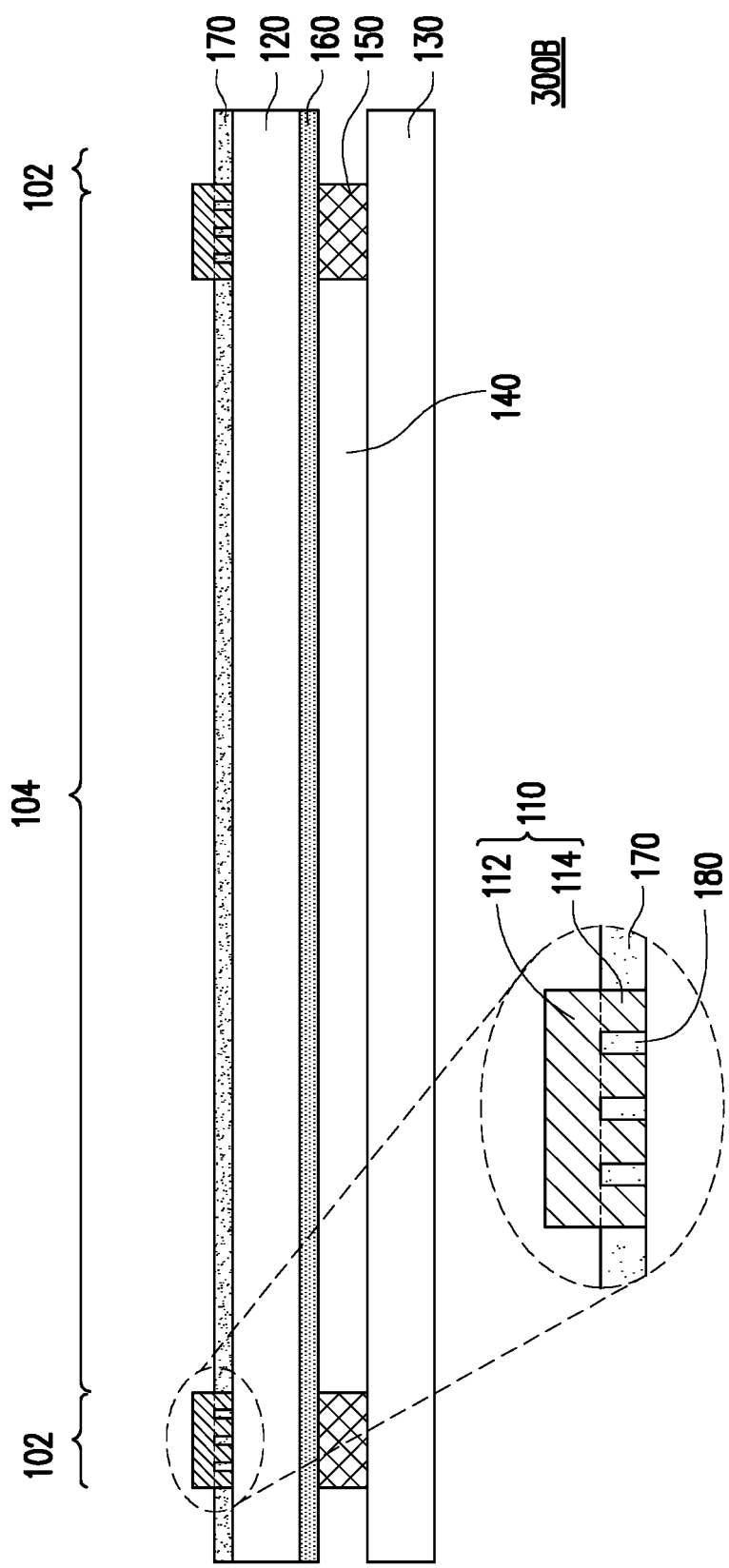

In other embodiments, the hydrophobic material layer 190 may be absent from the peripheral region, for example, as the display panel 300A illustrated in FIG. 3A or may be completely absent, for example, as the display panel 300B illustrated by FIG. 3B. The display panel 300A and the display panel 300B are substantially similar to the display panel 100B, and the same or similar reference numbers in these embodiments represent the same or similar elements or components. Specifically, the difference of the display panel 300A and the display panel 300B from the display panel 100B lies in the distribution of the hydrophobic material layer 190.

The following refers to FIGS. 4 to 9, each illustrating a cross section of a display panel according to an embodiment, and each of the embodiments illustrated in FIGS. 4 to 9 share common features with the embodiment illustrated in FIG. 1B. Only differences of each embodiment to the embodiment illustrated in FIG. 1B are henceforth described. Same or similar reference numbers in the description of the embodiments represent same or similar elements or components.

FIG. 4 schematically illustrates a cross section of a display panel according to another embodiment of the present disclosure. The display panel 400 may include the top substrate 120, the bottom substrate 130 opposite to the top substrate 120, the display medium layer 140, the sealant 150 disposed in between the top substrate 120 and the bottom substrate 130, the electrode layer 160 between the top substrate 120 and the display medium layer 140, the patterned antireflective layer 170, the hydrophobic material layer 190, the patterned light shielding layer 410, and the embedded patterns 480. The display panel 400 may have a top view similar to the display panel 100A illustrated in FIG. 1A so that the display panel 400 has the first region 102 and the second region 104 surrounded by the first region 102. In this embodiment, the display panel 400 differs from the display panel 100B of FIG. 1B in that a height H480 of each of the embedded patterns 480 is greater than a thickness T170 of the patterned antireflective layer 170. In addition, the patterned light shielding layer 410 may include the top portion 412 covering the top of the embedded patterns 480 and the extending portions 414 extending from the bottom of the top portion 412 toward the top substrate 120. The extending portions 414 may have the height similar to the height of each of the embedded patterns 480. Accordingly, the extending portions 414 cover the lateral side of the embedded patterns 480.

In the present embodiment, the embedded patterns 480 may be made of the same material as the patterned antireflective layer 170 and the fabrication process of the display panel 400 may further include the following steps, but is not limited thereto. After patterning the antireflective layer 270, illustrated in FIG. 2A, to form the patterned antireflective layer 170 and the embedded patterns 180 at a height equal to the patterned antireflective layer 170 and before forming the patterned light shielding layer 110, more of the material of the antireflective layer 270 is disposed on the embedded patterns 180 by patterned deposition through a shadow mask to form the embedded patterns 480. Alternatively, before patterning the antireflective layer 270 by, for example, dry or wet etching, the antireflective layer 270 is grown in the first region 102 by, for example, further deposition through another shadow mask, such that the height of the antireflective layer 270 over the entirety of the first region 102 is the desired height of the embedded patterns 480, that is a height greater than the thickness of the patterned antireflective layer 170 in the second region 104. The thicker antireflective layer in the first region 102 is then patterned by, for example, dry or wet etching, to form the embedded patterns 480 with a height greater than the thickness of the patterned antireflective layer 170.

Figure 5:
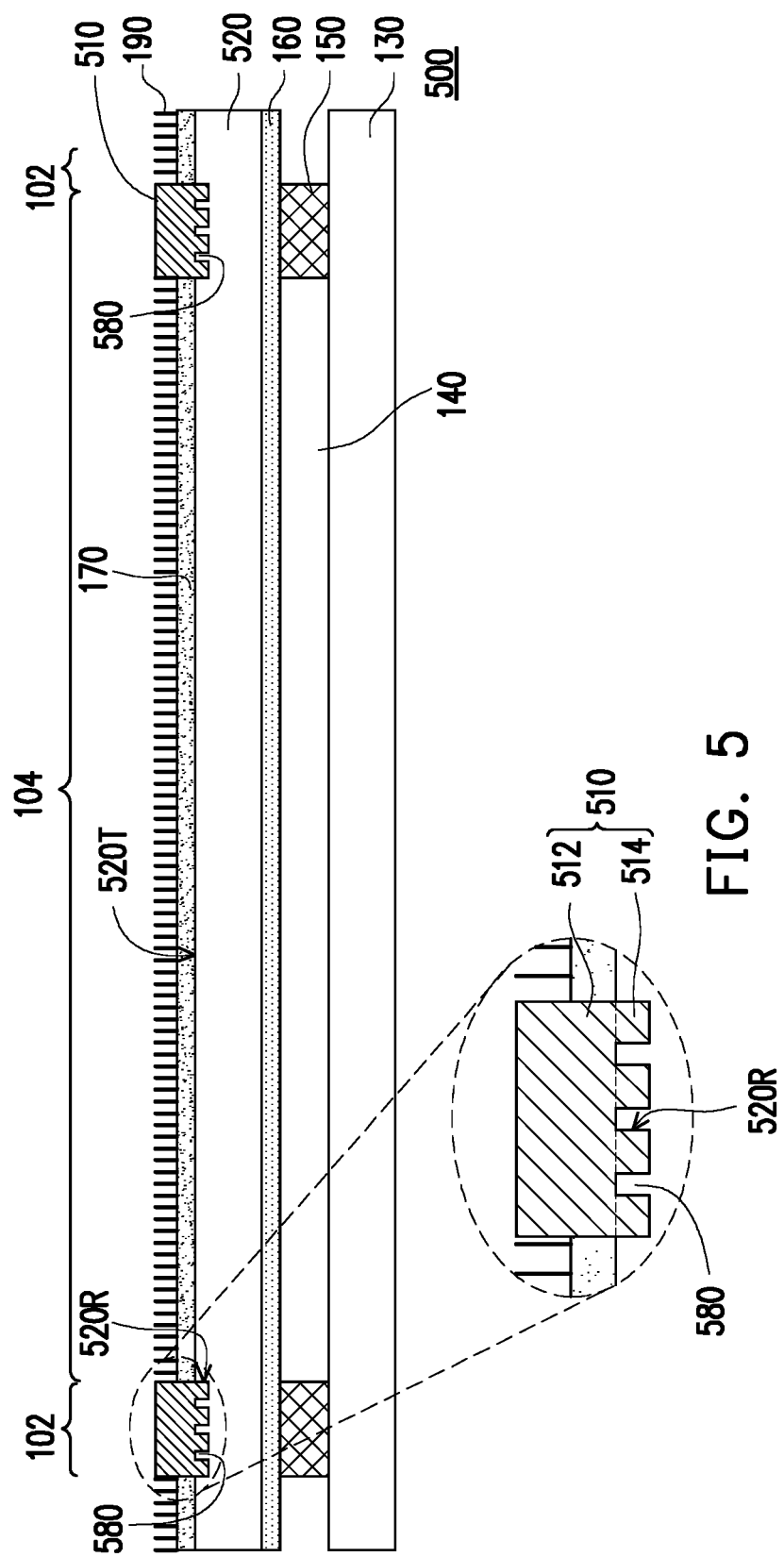

FIG. 5 schematically illustrates a cross section of a display panel according to another embodiment of the present disclosure. The display panel 500 may include the top substrate 520, the bottom substrate 130 opposite to the top substrate 520, the display medium layer 140, the sealant 150 disposed in between the top substrate 520 and the bottom substrate 130, the electrode layer 160 between the top substrate 520 and the display medium layer 140, the patterned antireflective layer 170, the hydrophobic material layer 190, the patterned light shielding layer 510, and the embedded patterns 580. The display panel 400 may have a top view similar to the display panel 100A illustrated in FIG. 1A so that the display panel 400 has the first region 102 and the second region 104 surrounded by the first region 102. In this embodiment, the display panel 500 differs from the display panel 100B of FIG. 1B in that the top substrate 520 has a plurality of recess 520R, and the patterned light shielding layer 510 includes the top portion 512 and the extending portion 514 extending from the top portion 512 to the recesses 520R. A depth of each of the recesses 520R may be in a range from a couple of micrometers to hundreds of micrometers. In the present embodiment, the patterns of the top substrate 520 located between the recesses 520R serve as the embedded patterns 580, so that the material of the embedded patterns 580 is identical to that of the top substrate 520 in the present embodiment, the embedded patterns 580 are formed integrally with the top substrate 520 and a top surface of one of the embedded patterns 580 is coplanar with the top surface 520T of the top substrate 520 in the second region 104. In addition, the bottom surface of the top portion 512 of the patterned light shielding layer 510 may be in contact with the top surfaces of the embedded patterns 580 and the bottom surface of the top portion 512 of the patterned light shielding layer 510 may be coplanar with the top surface of the top substrate 520 in the second region 104.

In the present embodiment, regarding a fabrication process of the display panel 500, the antireflective layer 270 as illustrated in FIG. 1A may be patterned to form the patterned antireflective layer 170 in the second region 104 and optionally in the peripheral region, but different from the step of FIG. 2B, the material of the antireflective layer 270 in the first region 102 may be completely removed according to the present embodiment so that the material of the antireflective layer 270 may be absent in the first region 102. In addition, after exposing the top substrate 520 in the first region 102, a patterning process may be performed to remove a portion of the top substrate 120 in the first region 102 so that the recesses 520R and the embedded patterns 580 are formed in the first region 102. The top substrate 520 may be patterned by, for example, dry or wet etching.

Figure 6A:
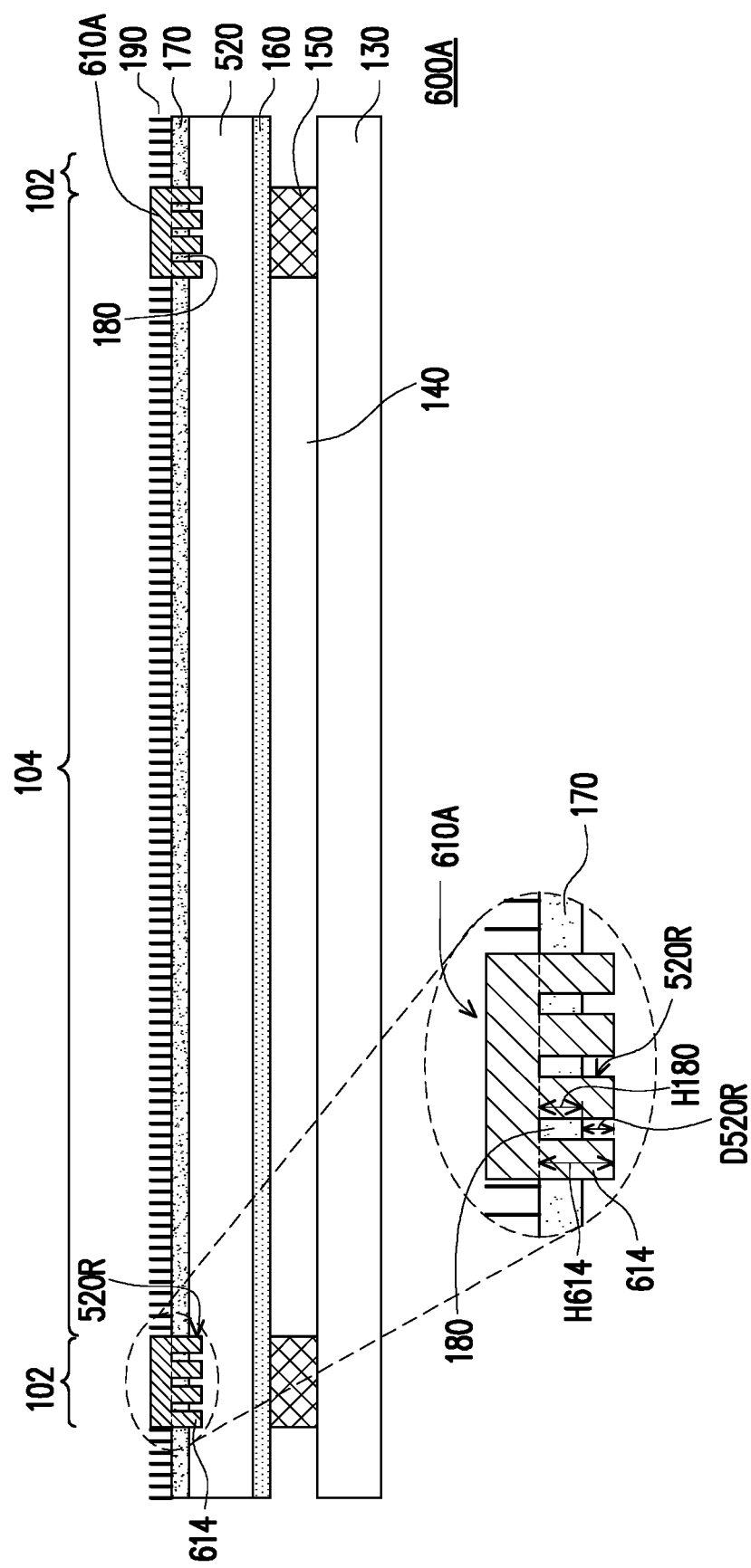

FIG. 6A schematically illustrates a cross section of a display panel according to further another embodiment of the present disclosure. The display panel 600A may include the top substrate 520, the bottom substrate 130 opposite to the top substrate 520, the display medium layer 140, the sealant 150 disposed in between the top substrate 520 and the bottom substrate 130, the electrode layer 160 between the top substrate 520 and the display medium layer 140, the patterned antireflective layer 170, the hydrophobic material layer 190, the patterned light shielding layer 610A, and the embedded patterns 180. The display panel 600A may have a top view similar to the display panel 100A illustrated in FIG. 1A so that the display panel 600A has the first region 102 and the second region 104 surrounded by the first region 102. In this embodiment, the display panel 600A differs from the display panel 100B illustrated in FIG. 1B in that the top substrate 520 includes a plurality of recesses 520R located in the first region 102, aligned with respective extending portions 614 of the patterned light shielding layer 610A. In the embodiment, a height H614 of each of the extending portions 614 of the patterned light shielding layer 610A may be substantially identical to a sum of the height H180 of each embedded patterns 180 and a depth D520R of each recess 520R, such that the extending portions 614 may completely fill the recesses 520R, respectively. A depth of the recesses 520R may be in a range from a couple of micrometers to tens of micrometers, but the disclosure is not limited thereto.

In the present embodiment, as compared to the example of a fabrication process of the display panel 100B illustrated in FIGS. 2A-D, a fabrication process of the display panel 600A may further include patterning the top substrate 520 to form the recesses 520R by, for example, dry or wet etching before forming the patterned light shielding layer 610A.

Figure 6B:
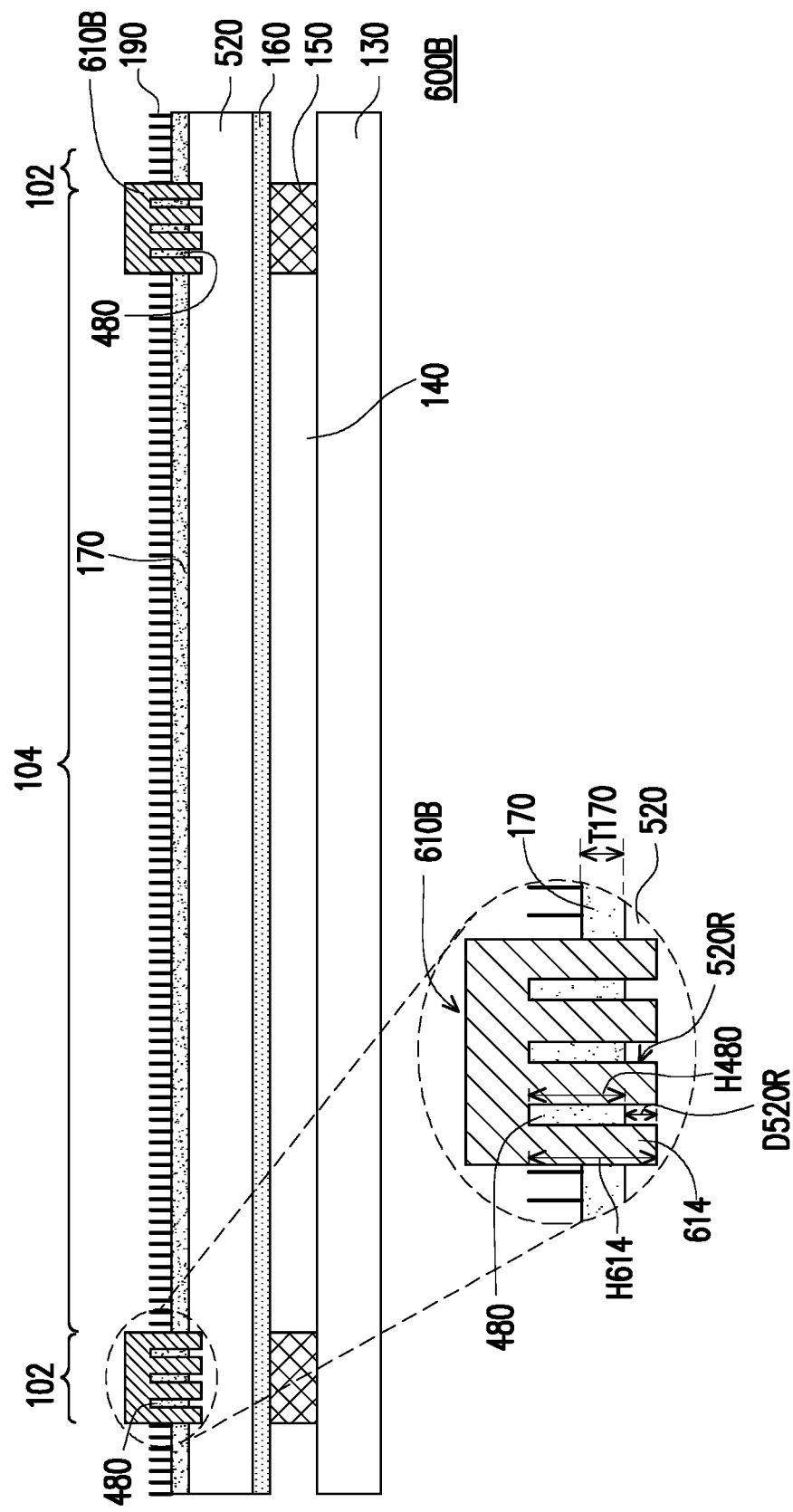

FIG. 6B schematically illustrates a cross section of a display panel according to another embodiment of the present disclosure. The display panel 600B may include the top substrate 520, the bottom substrate 130 opposite to the top substrate 520, the display medium layer 140, the sealant 150 disposed in between the top substrate 520 and the bottom substrate 130, the electrode layer 160 between the top substrate 520 and the display medium layer 140, the patterned antireflective layer 170, the hydrophobic material layer 190, the patterned light shielding layer 610B and the embedded patterns 480. The display panel 600B may have a top view similar to the display panel 100A illustrated in FIG. 1A so that the display panel 600B has the first region 102 and the second region 104 surrounded by the first region 102. In this embodiment, the display panel 600B differs from the display panel 600A illustrated in FIG. 6A in that the patterned light shielding layer 610B has the extending portions 614 with a greater height H614 and the embedded patterns 480 has the height H480 greater than the thickness T170 of the patterned antireflective layer 170. Specifically, a height H614 of each of the extending portions 614 of the patterned light shielding layer 610B may be substantially identical to a sum of the height H480 of each embedded pattern 480 and a depth D520R of each recess 520R.

Figure 7A:
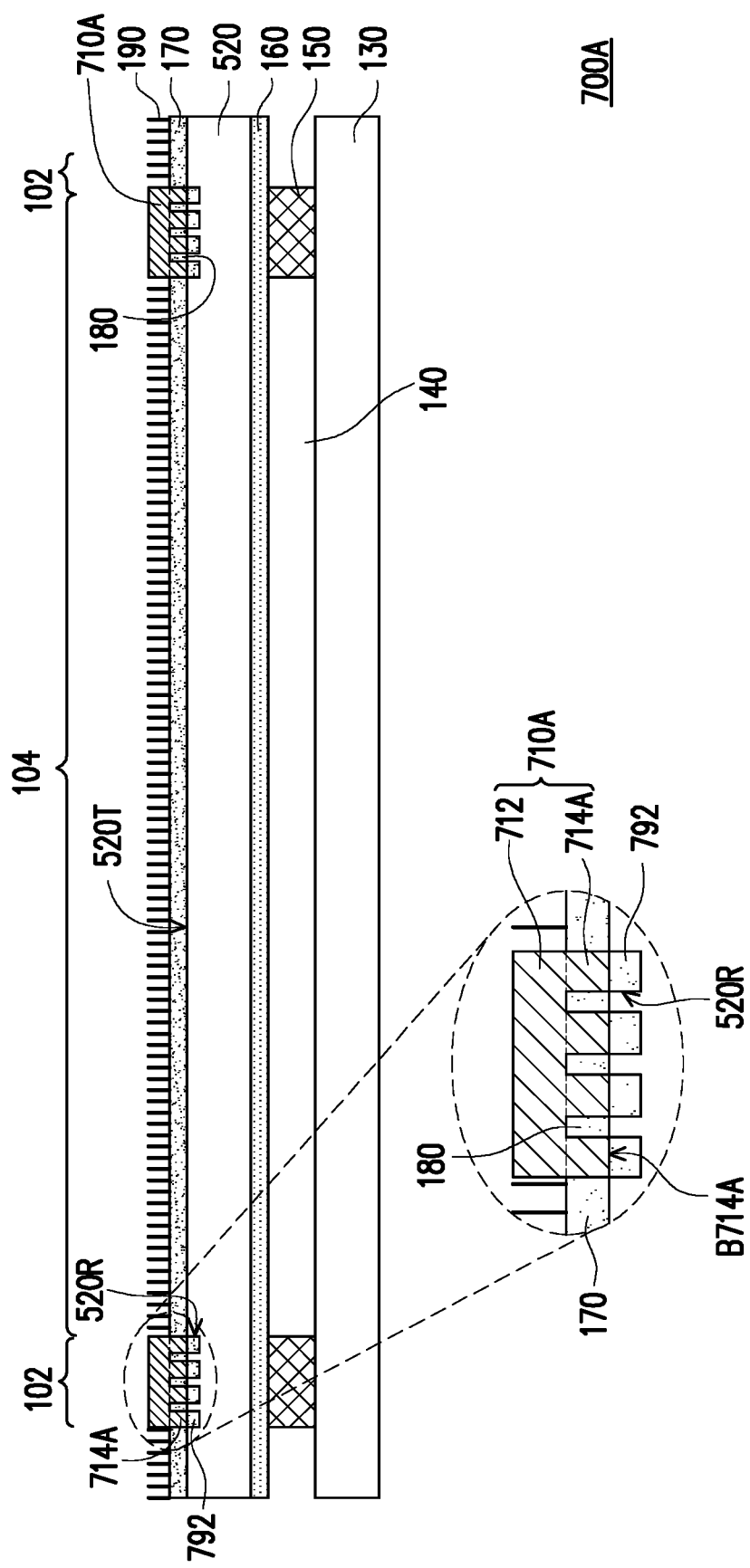

FIG. 7A schematically illustrates a cross section of a display panel according to further another embodiment of the present disclosure. The display panel 700A may include the top substrate 520, the bottom substrate 130 opposite to the top substrate 520, the display medium layer 140, the sealant 150 disposed in between the top substrate 520 and the bottom substrate 130, the electrode layer 160 between the top substrate 520 and the display medium layer 140, the patterned antireflective layer 170, the hydrophobic material layer 190, the patterned light shielding layer 710A, the embedded patterns 180 and the padding patterns 792. The display panel 700A may have a top view similar to the display panel 100A illustrated in FIG. 1A so that the display panel 700A has the first region 102 and the second region 104 surrounded by the first region 102. In this embodiment, the display panel 700A differs from the display panel 100B illustrated in FIG. 1B in that the top substrate 520 has a plurality of recesses 520R and the display panel 700A further includes a plurality of padding patterns 792 disposed in the recesses 520R respectively. Specifically, in the present embodiment, the patterned light shielding layer 710A may include the top portion 712 and the extending portions 714A positioned aligned with the recesses 520R respectively. Accordingly, the extending portions 714A are located on tops of the padding patterns 792. The padding patterns 792 formed in the recesses 520R are also aligned with the extending portions 714A and in contact with the extending portions 714A. The padding patterns 792 may be made of the material identical to the embedded patterns 180 and completely fill respective recesses 520R, so that the bottom surfaces B714A of the extending portions 714A of the patterned light shielding layer 710A may be coplanar with the top surface 520T of the top substrate 520 in the second region 104.

Figure 7B:
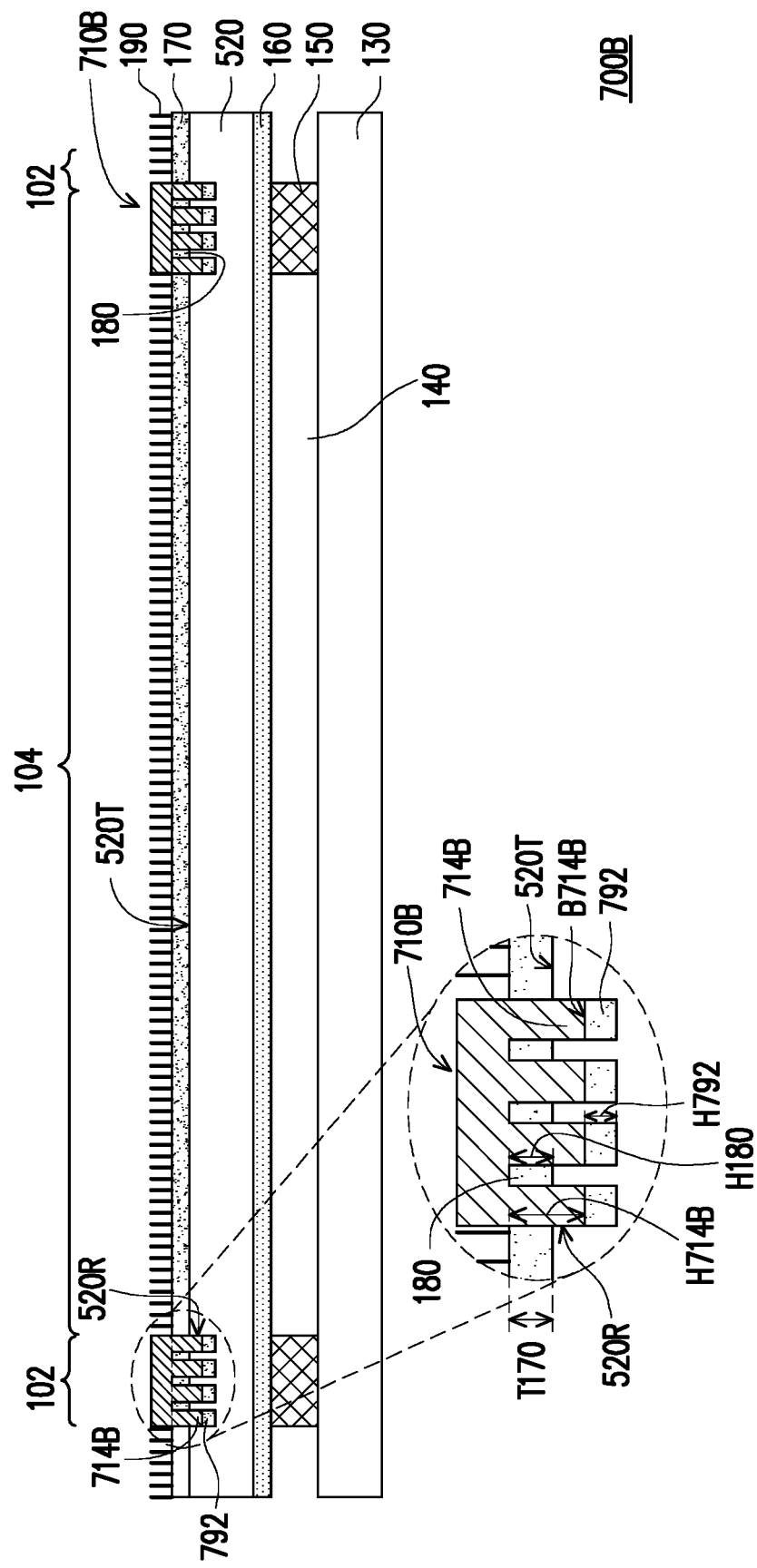

FIG. 7B schematically illustrates a cross section of a display panel according to another embodiment of the present disclosure. The display panel 700B may include the top substrate 520, the bottom substrate 130 opposite to the top substrate 520, the display medium layer 140, the sealant 150 disposed in between the top substrate 520 and the bottom substrate 130, the electrode layer 160 between the top substrate 520 and the display medium layer 140, the patterned antireflective layer 170, the hydrophobic material layer 190, the patterned light shielding layer 710B, the embedded patterns 180 and the padding patterns 792. The display panel 700B may have a top view similar to the display panel 100A illustrated in FIG. 1A so that the display panel 700B has the first region 102 and the second region 104 surrounded by the first region 102. In this embodiment, the display panel 700B differs from the display panel 700A illustrated in FIG. 7A in that the recesses 520R may have greater depth so that the padding patterns 792 partially fill the recesses 520R respectively, and the extending portions 714B extend in the recesses 520R respectively and the bottom surfaces B714B of the extending portions 714B of the patterned light shielding layer 710B are lower than the top surface 520T of the top substrate 520 in the second region 104. In other words, the height H714B of each extending portion 714B is greater than the height H180 of each embedded pattern 180. In some embodiments, the padding patterns 792, the embedded patterns 180 and the patterned antireflective layer 170 may be formed during the same film forming process, but the disclosure is not limited thereto. In addition, the height H792 of each padding pattern 792 may be identical to the height H180 of each embedded pattern 180 and the height H180 of each embedded pattern 180 may be identical to the thickness T170 of the patterned antireflective layer 170.

Figure 8:
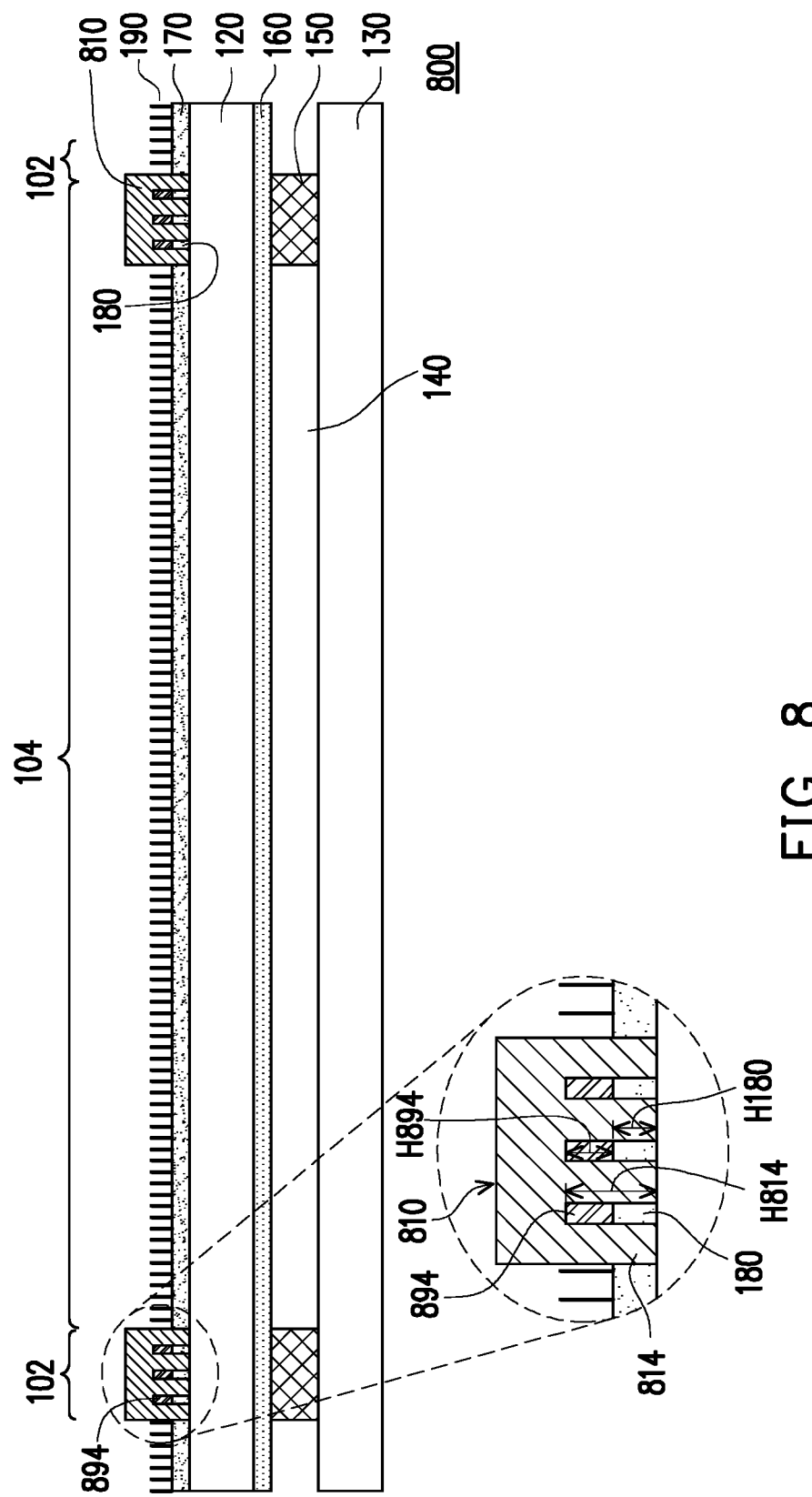

FIG. 8 schematically illustrates a cross section of a display panel according to another embodiment of the present disclosure. The display panel 800 may include the top substrate 120, the bottom substrate 130 opposite to the top substrate 120, the display medium layer 140, the sealant 150 disposed in between the top substrate 120 and the bottom substrate 130, the electrode layer 160 between the top substrate 120 and the display medium layer 140, the patterned antireflective layer 170, the hydrophobic material layer 190, the patterned light shielding layer 810, the embedded patterns 180 and the raising patterns 894. The display panel 800 may have a top view similar to the display panel 100A illustrated in FIG. 1A so that the display panel 800 has the first region 102 and the second region 104 surrounded by the first region 102. In this embodiment, the display panel 800 differs from the display panel 100B illustrated in FIG. 1B in that a plurality of raising patterns 894 aligned and disposed on respective tops of the embedded patterns 180 are further included in the display panel 800, and are encased by the patterned light shielding layer 810 and the embedded patterns 180. The raising patterns 894 are respectively aligned with the embedded patterns 180 to form a plurality of pillars in the first region 102. A material of the raising patterns 894 may be an inorganic material. In addition, a height H814 of each extending portion 814 of the patterned light shielding layer 810 may be a sum of a height H894 of one raising pattern 894 and a height H180 of one embedded pattern 180.

In the present embodiment, as compared to the example of a fabrication process of the display panel 100B illustrated in FIGS. 2A-D, a fabrication process of the display panel 800 may further include, after patterning the antireflective layer 270 and before forming the patterned light shielding layer 110, forming the raising patterns 894 over the embedded patterns 180 through patterned disposition of, for example, the inorganic material by, for example, deposition through a shadow mask over the embedded patterns 180. Alternatively, before patterning the antireflective layer 270, an inorganic layer may be formed in the first region 102 on the antireflective layer 270 and then the antireflective layer 270 and the inorganic layer thereon may be patterned during the same patterning process so that the structures of the raising patterns 894 stacking on the embedded patterns 180 are formed and the subsequently formed patterned light shielding layer 810 may cover the raising patterns 894 and the embedded patterns 180.

Figure 9:
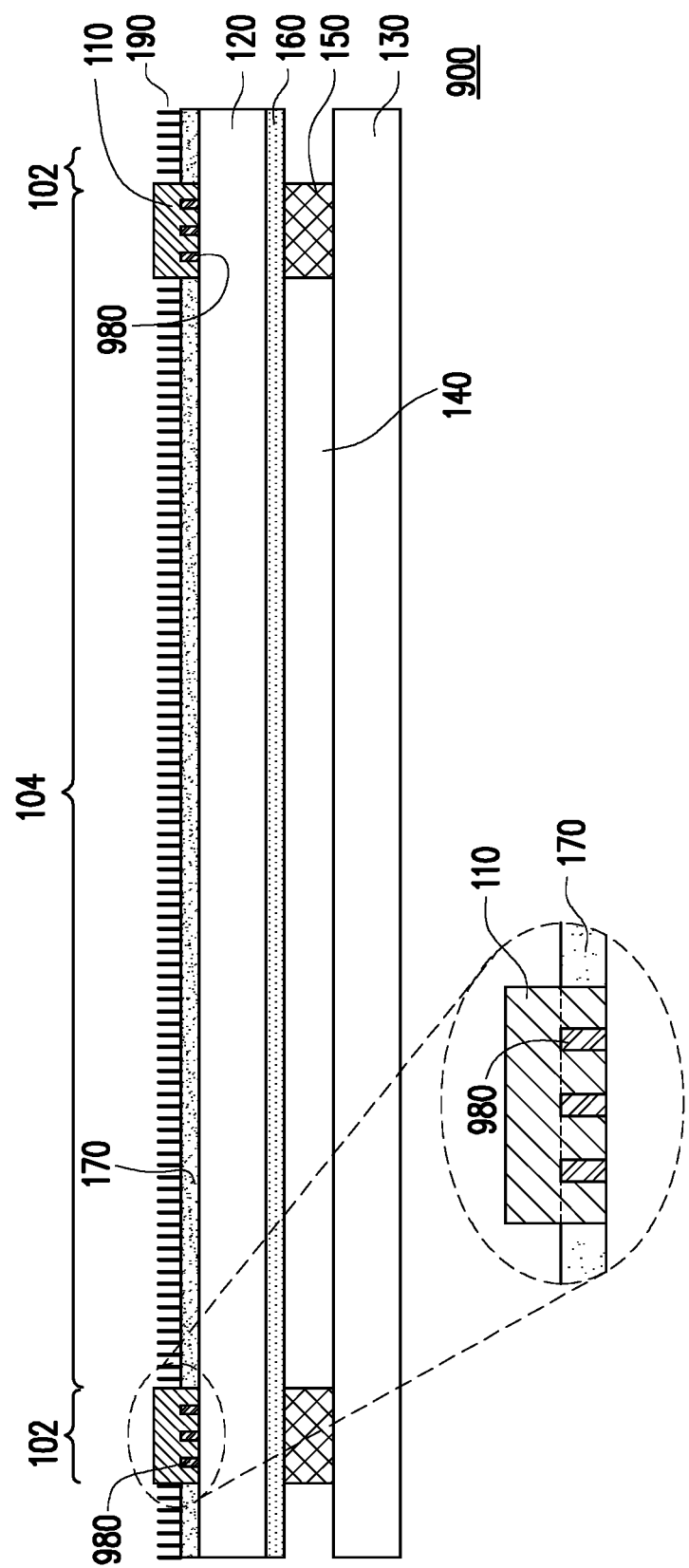

FIG. 9 schematically illustrates a cross section of a display panel according to another embodiment of the present disclosure. The display panel 900 may include the top substrate 120, the bottom substrate 130 opposite to the top substrate 120, the display medium layer 140, the sealant 150 disposed in between the top substrate 120 and the bottom substrate 130, the electrode layer 160 between the top substrate 120 and the display medium layer 140, the patterned antireflective layer 170, the hydrophobic material layer 190, the patterned light shielding layer 110, and the embedded patterns 980. The display panel 900 may have a top view similar to the display panel 100A illustrated in FIG. 1A so that the display panel 900 has the first region 102 and the second region 104 surrounded by the first region 102. In this embodiment, the display panel 900 differs from the display panel 100B illustrated in FIG. 1B in that the material of the embedded patterns 980 may be an inorganic material different from the patterned antireflective layer 170. In some embodiments, the material of the embedded patterns 980 may include $SiO_2$, $TiO_2$, $Al_2O_3$, ZnO, or a combination thereof, and it is not limited thereto.

In the present embodiment, regarding a fabrication process of the display panel 900, the antireflective layer 270 is patterned to form the patterned antireflective layer 170 in the second region 104 and optionally in the peripheral region, as with the example of a fabrication process of the display panel 100B illustrated in FIGS. 2A-D, but then differs in that the material of the antireflective layer 270 in the first region 102 is removed and the embedded patterns 980 are further formed of the inorganic material by, for example, patterned deposition of the inorganic material in the first region 102 through a shadow mask.

In some alternative embodiments of the display panels 400, 500, 600A, 600B, 700A, 700B, 800 and 900 illustrated in FIGS. 4 to 9, the hydrophobic material layer 190 may be absent from the peripheral region or may be completely absent. In addition, the height of the embedded patterns 180 and 480 may be varied according to different design requirements. For example, the embedded patterns 180 in the display panel 700A illustrated in FIG. 7A, the display panel 700B illustrated in FIG. 7B or the display panel 800 illustrated in FIG. 8 may be replaced by the embedded patterns 480 in the display panel 400 illustrated in FIG. 4. Furthermore, the recess-extending portion design as presented in the display panels 600A or 600B and the recess-extending portion-padding pattern design as presented in the display panels 700A or 700B may be applied to any of the display panels 800 and 900.

In view of the above, the display panel according to the embodiments of the disclosure is disposed with the embedded patterns in the first region where the patterned light shielding layer is formed and the embedded patterns cause a rough surface for contacting the patterned light shielding layer. Accordingly, the adhesion of the patterned light shielding layer onto the top substrate may be improved so that the patterned light shielding layer disposed on the embedded patterns provides a desirable light shielding function so as to improve the quality of the display panel.

It will be apparent to those skilled in the art that various modifications and variations can be made to the embodiments and concepts disclosed herein without departing from the scope or spirit of the invention. In view of the foregoing, it is intended that the present disclosure cover modifications and variations of this invention provided they fall within the scope of the following claims and their equivalents.

What is claimed is:

1. A display panel having a first region and a second region surrounded by the first region, the display panel comprising:
a top substrate;
a bottom substrate assembled with the top substrate;
a display medium layer disposed between the top substrate and the bottom substrate;
a patterned light shielding layer disposed on a top surface of the top substrate and located in the first region, wherein the patterned light shielding layer comprises a top portion and a plurality of extending portions between the top portion and the top substrate; and
a plurality of embedded patterns disposed on the top surface of the top substrate and located in the first region, wherein each of the embedded patterns is located between two of the adjacent extending portions and covered by the top portion.

2. The display panel according to claim 1, further comprising a patterned antireflective layer disposed on the top surface of the top substrate and located in the second region, wherein the patterned antireflective layer is surrounded by the patterned light shielding layer.

3. The display panel according to claim 2, further comprising a hydrophobic material layer disposed on the patterned antireflective layer, wherein the hydrophobic material layer is absent in the first region.

4. The display panel according to claim 2, wherein a height of one of the embedded patterns is identical to a thickness of the patterned antireflective layer.

5. The display panel according to claim 2, wherein a height of one of the embedded patterns is greater than a thickness of the patterned antireflective layer.

6. The display panel according to claim 2, wherein a material of the embedded patterns is identical to a material of the antireflective layer.

7. The display panel according to claim 1, wherein a material of the embedded patterns is an inorganic material.

8. The display panel according to claim 1, wherein a material of the embedded patterns is identical to a material of the top substrate.

9. The display panel according to claim 8, wherein a top surface of one of the embedded patterns is coplanar with the top surface of the top substrate in the second region.

10. The display panel according to claim 8, wherein the embedded patterns are formed integrally with the top substrate.

11. The display panel according to claim 1, wherein the top substrate has a plurality of recesses located in the first region and the recesses are positioned aligned with the extending portions respectively.

12. The display panel according to claim 11, wherein the extending portions extend in the recesses respectively.

13. The display panel according to claim 11, wherein a depth of one of the recesses is in a range from a couple of micrometers to hundreds of micrometers.

14. The display panel according to claim 11, further comprising a plurality of padding patterns respectively disposed in the recesses and the extending portions are respectively located on tops of the padding patterns.

15. The display panel according to claim 14, wherein a material of the padding patterns is identical to a material of the embedded patterns.

16. The display panel according to claim 14, wherein the padding patterns completely fill the recesses respectively and bottom surfaces of the extending portions are coplanar with the top surface of the top substrate in the second region.

17. The display panel according to claim 14, wherein the padding patterns partially fill the recesses respectively, and the extending portions extend in the recesses respectively and bottom surfaces of the extending portions are lower than the top surface of the top substrate in the second region.

18. The display panel according to claim 1, further comprising a plurality of raising patterns respectively disposed on tops of the embedded patterns.

19. The display panel according to claim 18, wherein the raising patterns are encased by the patterned light shielding layer and the embedded patterns.

20. The display panel according to claim 18, wherein the raising patterns are respectively aligned with the embedded patterns.

21. The display panel according to claim 18, wherein a material of the raising patterns is an inorganic material.

22. The display panel according to claim 1, wherein a width of each of the embedded patterns is in a range from a couple of micrometers to tens of micrometers.

23. The display panel according to claim 1, wherein a pitch of the embedded patterns is in a range from a couple of micrometers to tens of micrometers.

24. The display panel according to claim 1, further comprising an electrode layer disposed on the top substrate and located between the top substrate and the display medium layer.

25. The display panel according to claim 1, further comprising a sealant disposed between the top substrate and the bottom substrate, wherein the sealant is located in the first region and surrounds the display medium layer.

* * * * *